United States Patent [19]
Julian

[11] Patent Number: 5,106,319
[45] Date of Patent: Apr. 21, 1992

[54] BATTERY CABLE TERMINATION

[75] Inventor: Kenneth A. Julian, Oak Brook, Ill.

[73] Assignee: Julian Electric, Inc., Westmont, Ill.

[21] Appl. No.: 653,304

[22] Filed: Feb. 11, 1991

[51] Int. Cl.[5] .................... H01R 11/26; H01R 11/32
[52] U.S. Cl. .................... 439/224; 439/750;
439/766; 439/883; 439/175
[58] Field of Search ............... 439/504, 755, 765, 766,
439/771, 868, 883, 805, 750, 217, 218, 224, 175

[56] References Cited

U.S. PATENT DOCUMENTS

| | | | |
|---|---|---|---|
| 1,507,936 | 9/1924 | Schmitt | 439/771 |
| 3,633,147 | 1/1972 | Polidori | 439/805 |
| 4,394,533 | 7/1983 | Naito | 439/883 |
| 4,932,896 | 6/1990 | Julian | 439/504 |

*Primary Examiner*—Gary F. Paumen
*Attorney, Agent, or Firm*—Edmond T. Patnaude

[57] ABSTRACT

The present invention relates to a new and improved battery cable termination having an auxiliary terminal extending from one end of the termination in coaxial relationship with the associated cable.

5 Claims, 1 Drawing Sheet

BATTERY CABLE TERMINATION

BACKGROUND OF THE INVENTION

The prior art battery cable terminations have included a connector which is adapted to be connected a terminal of a storage battery and an auxiliary terminal for connecting the same terminal of the battery to another piece of equipment, such for example, as a lamp. Such terminals have extended in directions parallel to the associated battery terminals in spaced relationship therewith.

It has been found that the termination known in the prior art have been unsuitable for use in certain applications where there is little clearance between the battery terminals and another structure such as a bulkhead making it difficult if not impossible to connect a wire or cable to the auxiliary terminal without the risk of short circuiting the terminal to ground. Consequently, there is a risk of damage to the equipment and a possible electric shock to the person attempting to make the connection.

Nevertheless, it would be desirable to provide an auxiliary terminal for connecting a battery terminal to auxiliary devices where clearance between the battery terminals and another structure is at a minimum.

SUMMARY OF THE INVENTION

Briefly, there is provided in accordance with the present invention a novel termination which is adapted to be connected to one end portion of a battery cable for connecting the cable to a terminal of a storage battery. The termination includes a transverse opening for receiving a battery terminal, and the distal end of the cable extends beyond the opening into a metallic tube which is compressed onto the strands of the cable to firmly secure the tube to the cable. A threaded stud extends from the outer end of the metallic tube to provide an auxiliary terminal for receiving a suitable connector and associated wire for connection to an auxiliary device. The termination including the metallic tube is enclosed in an insulating cover.

In an alternative embodiment of the invention, a terminal head having a threaded stud of a lesser diameter extending axially therefrom is threadedly secured to the threaded stud extending from the tube portion of the termination

BRIEF DESCRIPTION OF THE DRAWING

The present invention will be better understood from a reading of the following detailed description taken in connection with the accompanying drawings wherein.

DETAILED DESCRIPTION OF A PREFERRED EMBODIMENT

Figure 1:
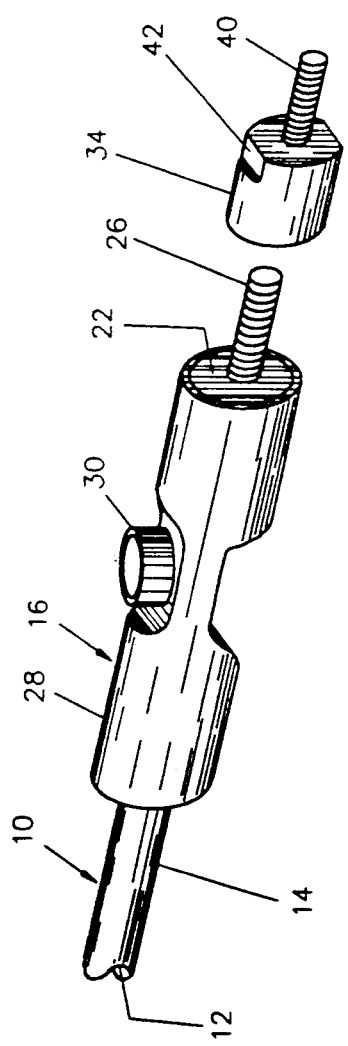
FIG. 1 is an isometric, exploded view of a battery cable termination embodying the present invention.
Figure 2:
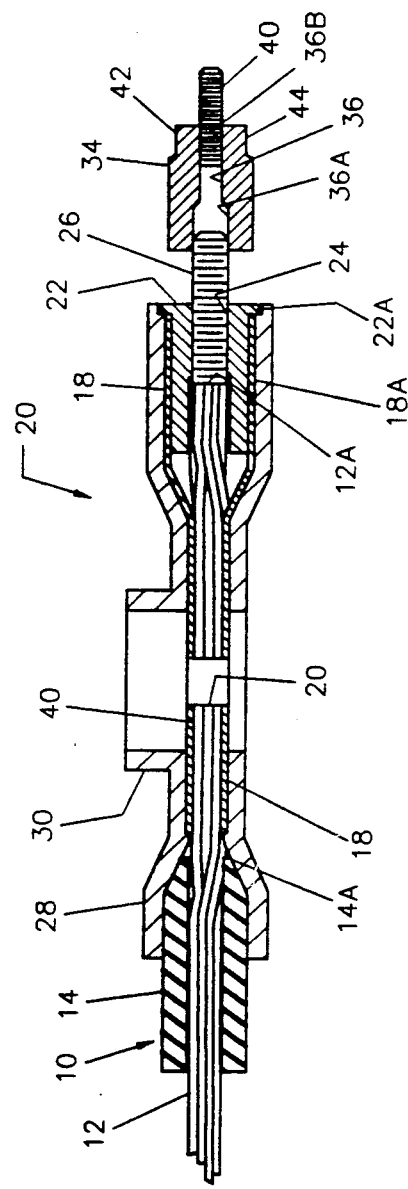
FIG. 2 is a longitudinally cross-sectioned view of the battery cable termination shown in FIG. 1.

Referring to the drawing, a conventional battery cable 10 includes a plurality of conductive metal wires 12 enclosed within an insulating covering 14 suitably formed of plastic. The cable extends into a cable termination generally identified by the reference number 16 with the covering 14 terminating at 14a, a substantial distance from the distal ends 12a of the wires 12. The wires 12 extend through a metal tube 18 which is compressed onto the wires 12 to form a central flat area through which a transverse hole 20 is provided.

In accordance with the present invention a generally tubular metallic part 22 has an axial bore 24 into one end of which the distal end portion of the stranded wires 12 extend. The part 22 extends into the end 18a of the tube 18 and has an external annular flange 22a which abuts the adjacent end 18a of the tube to facilitate assembly of the termination. A threaded stud 26 is threaded into a complimentary axial opening in the part 22 and the tube 18 is compressed onto the part 22 to firmly secure the wires 12 and the part 22 together as well to lock the stud 26 to the part 22 to prevent spurious disassembly of the stud 26 from the termination.

An insulating cover 28 encloses the conductive parts of the termination 16 and includes an upstanding sleeve portion 30 for receiving a battery terminal or other terminal member (not shown) which extends through the hole 20.

The stud 26 may be used to attach a customary termination which would be disposed over the stud 26 and held in place by a bolt, not shown. Alternately, a terminal head 34 may be disposed over the stud 26 to facilitate the use of jumper cables having alligator type connectors. The terminal head 34 is formed of metal and includes an internally threaded hole 36 one end 36A of which threadedly receives the stud 26 and the other end 36B of which threadedly receives a threaded stud 40 which extends from the end of the head member 34. A pair of diametrically opposed flats 42 and 44 are provided on the terminal head 34 for receiving a wrench for tightening the terminal head 34 onto the stud 26.

The termination 16 is preferably manufactured in the following manner. After stripping the insulating cover 14 from the end portion of the wires 12, the metal tube 18 is slipped over the distal end portion of the cable leaving a short length of the wires 12 extending from the outer end of the tube. The end portions of the wires 12 are then inserted into the hole 24 in the part 22 and soldered thereto. The stud 26 may be assembled to the part 22 either before or after the wires 12 are attached thereto. The tube 18 is then slid back along the cable 10 over the part 22 into engagement with the flange 22a. The assembled parts are then placed in a hydraulic press and pressed into the final shape wherein the intermediate parts of the wires 12 and the tube 18 are flattened, and the part 22 is deformed to firmly secure the part 22 to the wires 12 and to lock the stud 26 in place in the part 22 to prevent inadvertent disassembly thereof from the termination. If desired, solder may be applied to the exposed areas of the wires 12 and the tube 18 before the cover 28 is molded thereon.

While the present invention has been described in connection with a particular embodiment thereof, many changes and modifications may be made without departing from the true spirit and scope thereof. Therefore, it is intended by the appended claims to cover all such changes and modifications which come within the true spirit and scope of the invention.

What is claimed:

1. A termination for the end of a battery cable having stranded wires enclosed in an insulating covering, the termination comprising in combination:
    a metal part having two ends and an inner bore,
    a metal tube having two opposite ends, one of said ends of said metal tube being fitted over one of said ends of said metal part, said strands of wire extending beyond the ends of said covering and into the other of said ends of said metal tube and into said bore in said metal part, said metal tube being compressed over said strands of wire and said one of said ends of said metal part, attachment means for attaching said compressed metal tube to the terminal separate from said metal part and of a battery, and an auxiliary terminal extending from the other of said ends of said metal part.

2. A termination for a battery cable in accordance with claim 1 wherein said metal part further comprises:

an external annular flange adjacent said other of said ends of said metal part and, said metal tube abuts against said flange.

3. A termination for a battery cable in accordance with claim 2 and further comprising:

an insulating cover surrounding the end portion of said covering of said cable and said metal tube leaving uncovered said attachment means and said auxiliary terminal.

4. A termination for a battery cable in accordance with claim 1 wherein, said attachment means is a flattened portion of said compressed metal tube having a transverse hole therethrough adapted to receive a terminal of a battery.

5. A termination for the end of a battery cable having stranded wires enclosed in an insulating covering, the termination comprising in combination:

an electrically conductive elongate central portion having two opposite ends, said strands of wire extending beyond the end of said covering and into one of said ends of said central portion;

attachment means for attaching said electrically conductive central portion to the terminal of a battery;

a threaded stud connected to said strands of wire and projecting from the other of said ends, a terminal head having two ends, one of said ends having an axially threaded bore therein adapted to receive said threaded stud, and a second threaded stud projecting axially from the other of said two ends of said terminal head.

* * * * *

UNITED STATES PATENT AND TRADEMARK OFFICE
CERTIFICATE OF CORRECTION

PATENT NO. : 5,106,319
DATED : April 21, 1992
INVENTOR(S) : Kenneth A. Julian

It is certified that error appears in the above-identified patent and that said Letters Patent is hereby corrected as shown below:

In column 3, line 7, after "terminal" delete "separate from said metal part and"

In column 3, line 9, after "terminal" insert --separate from said metal part and--

Signed and Sealed this

Twenty-second Day of June, 1993

Attest:

MICHAEL K. KIRK

Attesting Officer

Acting Commissioner of Patents and Trademarks